April 3, 1951   D. D. AUSTIN, SR   2,547,517
METHOD FOR SHAVING CROWN GEARS BY ROCKING
Filed April 29, 1947

*INVENTOR.*
DONALD D. AUSTIN SR.
BY
Whittemore, Hulbert
& Belknap   ATTORNEYS

Patented Apr. 3, 1951

2,547,517

UNITED STATES PATENT OFFICE 2,547,517

METHOD FOR SHAVING CROWN GEARS BY ROCKING

Donald D. Austin, Sr., Detroit, Mich., assignor to National Broach & Machine Company, Detroit, Mich., a corporation of Michigan Application April 29, 1947, Serial No. 744,677

9 Claims. (Cl. 90—1.6)

The present invention relates to a method for shaving crown gears.

The new method of shaving crown gears is applied to a process known in the art as crossed axes gear shaving. This practice comprises a gear-like cutter formed of tool steel and having the blanks of the teeth provided with narrow grooves extending generally up and down the teeth so as to provide sharp cutting edges in the tooth surface. A gear-like cutter is selected of such helix angle that it will mesh with the work gear with their axes crossed at a limited angle preferably between 2° and 30°. The nature of the meshing engagement between a pair of gears at the crossed axes relationship referred to is such that in theory the teeth of the gear and the teeth of the gear-like cutter contact at a theoretical point. In practice, due to the fact that the surfaces of the cutter teeth are interrupted as aforesaid and due to compression of metal and other reasons, the actual contact between the teeth of the cutter and gear occupies a small zone.

If the gear and tool were rotated in mesh without other relative motion, the teeth of the cutter would generate relatively narrow zones extending straight up and down spur teeth and diagonally up and down the teeth of a helical gear, and if a depth feed were superimposed upon rotation without other relative motion the gear would have machined therein concave grooves parallel to the narrow zones referred to. In order to provide accurate finishing of the gear teeth from end to end it is therefore necessary to superimpose an additional motion between the gear and cutter so as to distribute the cutting action of the cutter from end to end of the gear teeth.

When the crossed axes method of shaving came into use some years ago it was the usual practice to provide for a relative reciprocation between the cutter and gear in a direction parallel to the axis of the gear. This distributed the cutting action uniformly from end to end of the gear teeth but resulted in excessive wear on the cutter teeth, since only a narrow portion of the cutter teeth entered into the cutting action.

More recently it has been found that superior results are obtained when the direction of relative reciprocation between the cutter and gear is in a plane parallel to the axes of both gear and cutter, which direction extends in said plane at an angle diagonal to the axes of both gear and cutter and which direction does not approach a perpendicular to the axis of the gear or cutter.

Gear teeth finished in accordance with either of the above methods were uniform from end to end. It has become desirable to provide gear teeth which are modified from end to end or crowned so that a pair of such gears take contact adjacent the mid portions of the teeth and avoid end contact. This desirable mating condition will of course be obtained with a pair of gears only one of which is crowned, the other of which is unmodified. Originally crowning of gear teeth during the crossed axes shaving operation was carried out by relatively rocking the gear and tool in timed relation to the traverse referred to. In other cases the crowning operation was performed by superimposing upon the relative traverse a gradual depth feed which caused the cutter to take a greater depth of cut adjacent the ends of the gear teeth than centrally thereof. It was also suggested that it may be possible to crown gear teeth by providing a relative rocking motion between the gear and cutter in the absence of a relative traverse, but this method was thought to be limited to a relative rocking motion about an axis perpendicular to the direction of the engaged teeth of the gear and cutter, and it was further thought that it should be a very slow rocking, on the order of .0001 inch per revolution of the gear.

It has now been found that gear teeth may be crowned in a crossed axes shaving operation by a method characterized by comparatively rapid relative rocking motion between the gear and cutter while the same are rotated at substantial speeds. This rocking motion is carried out in the absence of traverse.

With the foregoing general remarks in mind, it is an object of the present invention to provide a new method of crowning gears by a crossed axes shaving operation.

It is a further object of the present invention to provide a method of crowning gears during a crossed axes shaving operation in which a relative rocking motion between the gear and gear-like cutter is carried out at substantial speeds, and in a direction diagonal to the axis of said gear.

It is a further object of the present invention to provide a method of crowning gear teeth by rolling the gear to be finished in mesh with a gear-like cutter at crossed axes, simultaneously providing a relative rocking motion between the gear and cutter about an axis which extends at an angle with respect to the axis of the gear.

Other objects and features of the invention will become apparent as the description proceeds, especially when considered in conjunction with the accompanying drawings, wherein.

Figure 1:
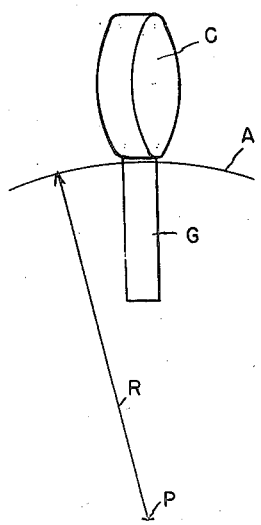
Figure 1 is a diagrammatic view illustrating a limiting condition in the present method of crowning gears.

Referring now to Figure 1, there is illustrated at C a tool in the form of a gear-like cutter and at G a work gear. The cutter C and the gear G are in mesh at crossed axes and the shaving operation is carried out by rotating either the cutter or work gear directly, thereby driving the other member. Superimposed upon the rotation of the gear and cutter is a relative rocking motion which takes place about a pivot axis P and in the particular embodiment illustrated the work gear G may be rocked about the axis P having a radius R. Accordingly, the top edge of the gear G which is in engagement with the cutting tool C moves in an arc designated A.

In a specific case, the following conditions were present. The axis of rocking was perpendicular to the gear axis and the radius of rocking was 14½ inches. The work gear G was rocked through a total angle of 2° 40' or 1° 20' each side of center. The cutter was 7 inches in diameter and had 53 teeth whereas the gear G was provided with 22 teeth. Cutter rotation was 330 R. P. M. The gear was rocked at a rate of 9 complete rocks a minute. The rocking motion of the gear was provided by an eccentric, with the result that linear motion of the top edge of the gear in the arc A reached a maximum of .024 inch per revolution of the gear and its average value throughout the rocking motion was .015 inch per revolution.

The arc through which the gear was rocked was such that the trailing ends of the gear teeth were brought to within .164 inch from the center of the cutter teeth and the amount of crown imparted was approximately .0015 inch. The operation was carried out by initiating rotation of the gear and cutter and initiating the rocking motion. After the gear had completed 3 rocks, direction of rotation of the gear and cutter was reversed and the operation continued until the gear had completed an additional 3 rocks. At this time the rotation and rocking motion were discontinued. It was found that a very desirable crown shape had been imparted to the teeth of the gear and that the surface finish thereon was very satisfactory.

For clarity, a complete rocking motion is referred to herein as alternate inclination of the axis of the rocked member in both directions, and return to initial position.

As is apparent, the amount of crown imparted by the method described above is a function of the radius of oscillation or rocking movement of the gear and is further a function of the arc through which rocking takes place. It has been found that the rate of rocking movement should be such that axial advance of the work through the plane of the cutter is not less than .005 inch per revolution of the gear and it may be substantially above the .015 inch per revolution average referred to above.

The rocking motion just described has the effect of moving the teeth of the gear through the tooth spaces of the cutter in a manner to finish the tooth surfaces from end to end and at the same time to impart a desirable crowned shape thereto. This operation is carried out without the conventional traverse.

In the particular operation described above, the corner of the gear did not pass the center line of the cutter, but it is within the scope of the present invention to employ an amplitude of rocking such that the end corners of the gear teeth pass the center line, thus providing a completely rounded profile, and entering into backlash at the limits of the rocking strokes.

The presence of backlash at either or both ends or limits of relative rocking motion between the gear and cutter affords an opportunity for carrying out a depth feed in a direction radially of said gear without cramping the cutter into the gear. Therefore, if feed is necessary or desirable, I prefer to provide such feed at an end of relative rocking motion while the teeth of the gear and cutter are in backlash.

This condition of backlash also permits a more efficient over-all operation where radial depth feed is unnecessary. Diagonal rocking as described herein is a very rapid, efficient method capable of removing relatively large amounts of stock. Thus in the usual case a gear may be finished without in-feed, the entire operation taking place with only the relative movements of rotation and rocking. In this case, I prefer to terminate rocking at one end of rocking movement while backlash exists and to load in this position, so that no cramping of gear and cutter results.

Figure 2:
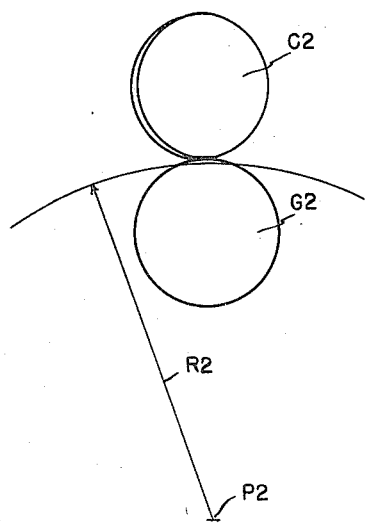
Figure 2 is a diagrammatic view illustrating a second limiting condition in gear finishing operations.

Referring now to Figure 2, there is illustrated a second limiting condition in which the gear G2 and cutter C2 are shown as in mesh at limited crossed axes. In this case the axis of the gear G2 extends perpendicular to the plane of the figure. If now a relative rocking motion such as would be obtained by rocking the gear G2 about the pivot axis P2 with a radius R2 were provided, the teeth of the gear G2 would not be crowned in the sense that they would be of reduced thickness adjacent the ends. Instead, the teeth would be reversely crowned or would be of less thickness at their mid portions than at their ends. This condition is not ordinarily desirable but is illustrated to indicate that the present method may be employed to provide variable crowns to the teeth of gears.

Figure 3:
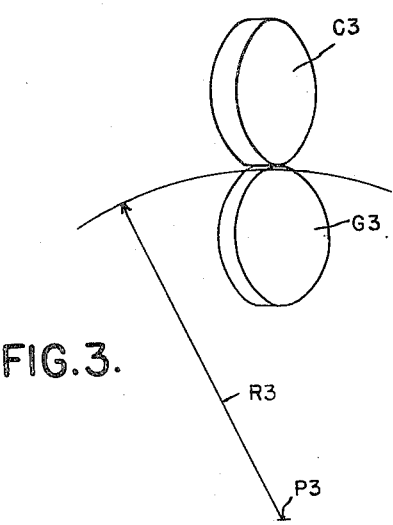
Figure 3 is a diagrammatic view illustrating a typical set-up in the present method of crowning gears.

Referring now to Figure 3, there is illustrated a typical set-up in which a cutter C3 in the form of a gear-like cutter meshes at crosssed axes with a work gear G3. In this instance the work gear G3 is illustrated as having its axis extending at an angle of approximately 45° to the plane of the figure. If now a relative rocking motion is introduced between the tool C3 and the gear G3 such as would be produced by rocking the gear G3 about the pivot axis P3 with a radius R3 a new condition exists. In this case it will be observed that the axis about which the relative rocking motion takes place extends at a diagonal angle (in this case 45°) to the axis of the gear. This angle is selected independently of the direction of the engaged teeth of the gear and tool. It is found that with a given radius R3, and a given arc of rocking, the angle between the axis P3 and the axis of the gear determines the amount of crown. Thus, for example, in Figure 1 where the rocking motion takes place about an axis perpendicular to the axis of the gear, a maximum amount of crown is produced with a given radius and a given arc of rock. In Figure 2, in which the axis P2 about which the rocking takes place is parallel to the axis of the gear, a reverse crown is produced. By selecting a suitable angle intermediate the conditions illustrated in Figures 1 and 2, such, for example, as the condition illustrated in Figure 3, the amount of crown may be controlled as desired without the necessity of providing for changes in the radius of rocking.

Figure 4:
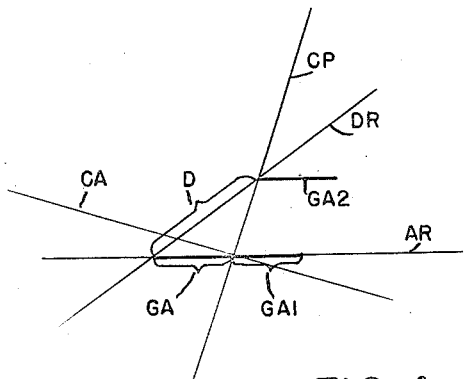
Figure 4 is a diagrammatic view illustrating axial advance of the gear through the plane of the cutter.

Referring now to Figure 4, there is diagrammatically illustrated the axial advance of the work through the plane of the cutter during the present method. It will be recalled that the cutter employed in this method is in the form of a gear having serrations running up and down its teeth which provide cutting edges. In order that the surface of the teeth of the gear machined by the present method shall be smooth, it is necessary to provide for a controlled axial advance of the gear through the plane of the cutter so that this axial advance shall be within certain limits for each revolution of the gear. If the advance is too slow, high production cannot be obtained. If the advance is too rapid, surface finish is impaired. In Figure 4 there is illustrated a cutter axis CA in angular relationship with a gear axis GA, these axes being illustrated as being crossed at a small angle. Perpendicular to the cutter axis is a line designated CP which represents the cutter plane. The line AR which is parallel to the gear axis GA is a direction of rocking which is termed axial rocking herein, in which the pivot axis about which the rocking takes place is perpendicular to the axis of the gear so that the plane of rocking is parallel to the axis of the gear.

The line DR represents a direction of diagonal rocking in which case the pivot axis about which the rocking motion takes place is diagonally disposed with respect to the axis of the gear.

In order to obtain similar surface finish when different directions of rocking are employed, the important factor to be considered is the advance of the gear axis GA through the cutting plane CP. Thus, for example, as the rocking motion takes place in the direction of the line AR a linear movement of the gear equal to its width will cause the gear axis to be moved from the position GA to the position GA1, and this of course corresponds to an axial advance of the work through the cutter plane CP equal to the length of the line GA.

However, if the direction of rocking is diagonal, as for example in the direction of the line DR, a different situation exists. In this case for the designated length of gear axis GA to be moved axially through the cutting plane CP a greater distance of travel is required. The distance of travel which would be required to move the gear entirely through the cutting plane is designated in Figure 4 as D, which, it will be observed, is substantially greater than the distance GA. In this figure, relative motion is indicated as traverse, rather than rocking, for clarity, but the advance of the teeth of the gear through the cutting plane of the cutter is found to be equivalent, so far as surface finish is concerned, when accomplished by rocking rather than traverse. In other words, when employing diagonal rocking the rate of rocking may be substantially increased without impairment of surface finish, and this in turn leads to more rapid production.

Where in the claims reference is made to axial advance of the gear through the cutting plane of the cutter, it is the foregoing relationship to which reference is made.

Briefly reviewed, the present invention teaches the crowning of a gear by rolling the same in mesh with a gear-like cutter at crossed axes and providing a rocking motion between the gear and cutter about an axis which is parallel to a plane parallel to the axes of both gear and cutter at mid position and which may extend in said plane at any angle from parallel to the axis of the gear to perpendicular thereto. Preferably the operation includes reversing the direction of rotation of the parts to equalize finishing action on both sides of the teeth.

The gear may be finished in a single stroke of rocking, or one-half of a complete rock. This amounts to providing a relative motion between the gear and cutter equivalent to moving the gear in an arcuate path in a single direction through mesh with the cutter about an axis which occupies a plane parallel to the axes of said gear and cutter in mid position, and which axis is diagonally disposed in said plane with respect to the axis of said gear.

While the foregoing description has been directed primarily to gear finishing by a shaving operation, the method may also be practiced as a lapping operation, where a gear-like lapping tool, formed of cast iron or the like, and employing a suitable abrasive, is substituted for the serrated shaving cutter. In this case speed of rotation and rate of rocking may be as conventional in the art, or greater than present conventional speeds.

The drawings and the foregoing specification constitute a description of the improved method for shaving crown gears by rocking in such full, clear, concise and exact terms as to enable any person skilled in the art to practice the invention, the scope of which is indicated by the appended claims.

What I claim as my invention is:

1. The method of crown shaving a gear which comprises meshing said gear with a serrated gear-like shaving cutter with their axes crossed at an angle of less than 30°, rotating said gear and cutter in mesh, and providing a relative rocking motion between said gear and cutter about a stationary axis which occupies a plane parallel to the axes of said gear and cutter in mid positions and which extends diagonally to the axis of said gear, the amplitude of such rocking motion being selected such that the trailing ends of said gear teeth reach the effective center line of said cutter at the ends of the rocking strokes.

2. The method of crown finishing a gear which comprises meshing said gear with a gear-like tool with their axes crossed at an angle of less than 30°, rotating said gear and tool in mesh, and providing a relative rocking motion between said gear and tool about a stationary axis which occupies a plane parallel to the axes of said gear and tool in mid positions and which extends diagonally to the axis of said gear, the amplitude of such rocking motion being selected such that the trailing ends of said gear teeth pass beyond the effective center line of said tool at the ends of the rocking strokes and enter into backlash thereat.

3. The method of crown shaving a gear which comprises meshing said gear with a serrated gear-like shaving cutter with their axes crossed at an angle of less than 30°, rotating said gear and cutter in mesh, and providing a relative rocking motion between said gear and cutter about a stationary axis which occupies a plane parallel to the axes of said gear and cutter in mid positions and which extends diagonally to the axis of said gear, the amplitude of such rocking motion being selected such that the ends of said gear teeth reach the effective center line of said cutter at the ends of the rocking strokes, the rate of rocking being such that the average axial advance of the gear through the plane of the cutter is not less than .005 inch per revolution of the work.

4. The method of crown shaving a gear which comprises meshing said gear with a serrated gear-like shaving cutter with their axes crossed at an angle of less than 30°, rotating said gear and cutter in mesh, and providing a relative rocking motion between said gear and cutter about a stationary axis which occupies a plane parallel to the axes of said gear and cutter in mid positions and which extends diagonally to the axis of said gear, the amplitude of such rocking motion being selected such that the ends of said gear teeth reach the effective center line of said cutter at the ends of the rocking strokes, the rate of rocking being such that the average axial advance of the gear through the plane of the cutter is approximately .015 inch per revolution of the work.

5. The method of crown finishing a gear which comprises meshing said gear with a gear-like tool with their axes crossed at an angle of less than 30°, rotating said gear and tool in mesh, and providing a relative rocking motion between said gear and tool about a stationary axis which occupies a plane parallel to the axes of said gear and tool in mid positions and which extends diagonally to the axis of said gear, the amplitude of such rocking motion being selected such that the trailing ends of said gear teeth pass beyond the effective center line of said tool at the ends of the rocking strokes and enter into backlash thereat and providing a depth feed radially of said gear at an end of said rocking motion while the teeth of said gear and tool are in backlash.

6. The method as defined in claim 2, in which the gear and tool are initially meshed in a position corresponding to one end of a rocking movement whereby said gear and tool are loaded in backlash.

7. The method as defined in claim 5, in which the gear and cutter are initially meshed in a position corresponding to one end of a rocking movement whereby said gear and cutter are loaded in backlash.

8. The method of crown shaving a gear which comprises meshing said gear with a gear-like cutter with their axes crossed at an angle of less than 30°, rotating said gear and cutter in mesh, and providing a relative rocking motion between said gear and cutter about a stationary axis which occupies a plane parallel to the axes of said gear and cutter in mid positions and which extends diagonally to the axis of said gear, the amplitude of such rocking motion being selected such that the trailing ends of said gear teeth pass beyond the effective center line of said cutter at the ends of the rocking strokes and enter into backlash thereat in which the entire shaving operation takes place without relative radial depth feed between gear and cutter.

9. The method of crown finishing a gear which comprises meshing said gear with a serrated gear-like finishing tool with their axes crossed at an angle of less than 30°, rotating said gear and tool in mesh, and providing a relative rocking motion between said gear and tool about a stationary axis which occupies a plane parallel to the axes of said gear and tool in mid positions and which extends diagonally to the axis of said gear, the plane of rocking of said gear being oblique to the direction of the engaged teeth of the gear and tool.

DONALD D. AUSTIN, Sr.

REFERENCES CITED

The following references are of record in the file of this patent:

UNITED STATES PATENTS

| Number | Name | Date |
|---|---|---|
| 2,157,981 | Drummond | May 9, 1939 |
| 2,249,251 | Mentley | July 15, 1941 |
| 2,277,041 | Drummond | Mar. 24, 1942 |
| 2,346,266 | Mentley | Apr. 11, 1944 |